(12) United States Patent
Meguriya et al.

(10) Patent No.: US 7,087,338 B2
(45) Date of Patent: Aug. 8, 2006

(54) POLYMER ELECTROLYTE FUEL-CELL SEPARATOR SEALING RUBBER COMPOSITION

(75) Inventors: Noriyuki Meguriya, Gunma-ken (JP); Yujiro Taira, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 596 days.

(21) Appl. No.: 10/374,048

(22) Filed: Feb. 27, 2003

(65) Prior Publication Data

US 2003/0165728 A1  Sep. 4, 2003

(30) Foreign Application Priority Data

Feb. 28, 2002  (JP) .............................. 2002-052811

(51) Int. Cl.
  H01M 8/02  (2006.01)
  H01M 8/10  (2006.01)
  H01M 2/08  (2006.01)
  C08G 77/00  (2006.01)
  C08K 3/34  (2006.01)

(52) U.S. Cl. .................... 429/35; 429/30; 429/34; 429/36; 524/492; 525/477

(58) Field of Classification Search ............... None
See application file for complete search history.

(56) References Cited

U.S. PATENT DOCUMENTS 5,516,838 A * 5/1996 Fujiki et al. ............. 524/711
6,153,326 A * 11/2000 Matsukawa et al. ......... 429/34
6,251,990 B1 * 6/2001 Meguriya et al. .......... 524/862
6,780,535 B1 * 8/2004 Meguriya et al. ........... 429/36
6,875,534 B1 * 4/2005 Nakamura et al. .......... 429/36
2002/0187385 A1 * 12/2002 Meguriya et al. ........... 429/36
2003/0032753 A1 * 2/2003 Meguriya et al. ........... 528/10
2003/0072988 A1 * 4/2003 Frisch et al. ............... 429/36

FOREIGN PATENT DOCUMENTS

| JP | 2000-920 A | 1/2000 |
| JP | 2000-33630 A | 2/2000 |
| JP | 2000-48832 A | 2/2000 |
| JP | 2000-62086 A | 2/2000 |
| JP | 2000-77084 A | 3/2000 |
| JP | 2000-133290 A | 5/2000 |
| JP | 2000-156215 A | 6/2000 |
| JP | 2000-176962 A | 6/2000 |
| JP | 2000-188118 A | 7/2000 |
| JP | 2000-231927 A | 8/2000 |
| JP | 2001-199002 A | 7/2001 |
| JP | 2001-216979 A | 8/2001 |

* cited by examiner

*Primary Examiner*—Michael Barr
*Assistant Examiner*—Robert Hodge
(74) *Attorney, Agent, or Firm*—Birch, Stewart, Kolasch & Birch, LLP

(57) ABSTRACT

A rubber composition comprising (A) an organopolysiloxane end-capped with alkenyldialkylsiloxy, dialkenylalkylsiloxy or trialkenylsiloxy radicals and free of aliphatic unsaturation on any side chain, (B) an organopolysiloxane containing at least three alkenyl radicals on molecular side chains, (C) an organohydrogenpolysiloxane having at least three Si—H radicals, (D) fumed silica, and (E) an addition reaction catalyst forms a seal member having improved strength and reduced compression set and useful for sealing a polymer electrolyte fuel-cell separator.

4 Claims, 1 Drawing Sheet

POLYMER ELECTROLYTE FUEL-CELL SEPARATOR SEALING RUBBER COMPOSITION

This invention relates to a rubber composition for use with separators in polymer electrolyte fuel cells which are typical small size fuel cells. It also relates to a seal member formed from the rubber composition and a polymer electrolyte fuel cell separator.

BACKGROUND OF THE INVENTION

Fuel cells have the great advantages that there is in a substantial sense no need for the fossil fuel which requires to pay attention to the depletion of resource, no or little noise is produced upon power generation, and the recovery of energy is high as compared with other energy power generation devices. The construction of fuel cells as relatively small size power generation plants installed in buildings and factories has been under development and some are used in practice. In particular, polymer electrolyte fuel cells operate at low temperature as compared with other types of fuel cell. They eliminate in a material aspect a concern about the corrosion of cell constituent parts and can discharge a relatively high current flow for low-temperature operation. They are thus of great interest not only as household cogeneration devices, but also as substitute power supplies for internal combustion engines on vehicles.

The polymer electrolyte fuel cells are constructed of several components including a separator which is generally in the form of a plate having a plurality of parallel channels in one or both surfaces thereof. The separator plays the roles of conducting to the exterior the electricity generated on the gas diffusing electrode within the fuel cell, discharging the water formed in the channels during the electricity generation process and maintaining the channels as a flowpath for reactant gas to flow into the fuel cell. Since the fuel-cell separators are required to be reduced in size, and a plurality of separators are used in stack, the sealing material generally takes the form of a relatively thin seal member having a thickness of less than about 2 mm. Therefore, there is a need for a separator sealing member which has improved strength and reduced compression set and remains fully durable in long-term service.

As the separator sealing member, sealing materials based on various resins have been under study in the art. Packing materials based on silicone rubber are often employed for their moldability, heat resistance and elasticity. The customarily used silicone rubbers are obtained by the curing of silicone rubber compositions of the addition curing type which are more effectively moldable. The customary silicone rubbers, however, suffer from the problem that compression set increases upon placing more importance on rubber strength whereas rubber strength becomes insufficient with more emphasis laid on compression set.

SUMMARY OF THE INVENTION

An object of the invention is to provide a rubber composition for use with polymer electrolyte fuel-cell separators, which forms a seal member having improved strength and reduced compression set. Another object is to provide a seal member formed from the rubber composition and a polymer electrolyte fuel cell separator.

It has been found that a rubber composition capable of forming the improved seal member can be formulated using an organopolysiloxane having crosslinking functional radicals only at ends of the molecular chain in combination with a certain proportion of another organopolysiloxane having crosslinking functional radicals on molecular side chains as well. More specifically, it has been found that a silicone rubber composition comprising, in adequate proportions, (A) an organopolysiloxane which is blocked at either end of the molecular chain with a radical independently selected from the group consisting of alkenyldialkylsiloxy, dialkenylalkylsiloxy and trialkenylsiloxy radicals, and which does not contain an aliphatic unsaturated monovalent hydrocarbon radical attached to a silicon atom on any molecular side chain, (B) an organopolysiloxane containing at least three alkenyl radicals attached to silicon atoms on molecular side chains per molecule, (C) an organohydrogenpolysiloxane having at least three hydrogen atoms attached to silicon atoms per molecule, (D) fumed silica having a specific surface area of 50 to 400 $m^2/g$, and (E) an addition reaction catalyst is suitable to form a seal member for a polymer electrolyte fuel-cell separator. The resulting separator seal member has improved strength and reduced compression set.

Accordingly, in one aspect, the present invention provides a rubber composition for sealing a periphery of at least one side of a polymer electrolyte fuel-cell separator, comprising, in parts by weight, (A) 70 to 95 parts of an organopolysiloxane which is blocked at either end of the molecular chain with a radical independently selected from the group consisting of alkenyldialkylsiloxy, dialkenylalkylsiloxy and trialkenylsiloxy radicals, and which does not contain an aliphatic unsaturated monovalent hydrocarbon radical attached to a silicon atom on any molecular side chain, (B) 5 to 30 parts of an organopolysiloxane containing at least three alkenyl radicals each attached to a silicon atom on molecular side chains per molecule, (C) 0.5 to 20 parts, per 100 parts of components (A) and (B) combined, of an organohydrogenpolysiloxane having at least three hydrogen atoms each attached to a silicon atom per molecule, (D) 10 to 40 parts, per 100 parts of components (A) and (B) combined, of fumed silica having a specific surface area of 50 to 400 $m^2/g$, and (E) a catalytic amount of an addition reaction catalyst.

In one preferred embodiment of the rubber composition for polymer electrolyte fuel-cell separator seals, the organopolysiloxane (A) has a (weight) average degree of polymerization of 200 to 2,000, and at least 90 mol % of the entire organic radicals (i.e., substituted or unsubstituted monovalent hydrocarbon radicals) attached to silicon atoms are methyl; component (A) has an alkenyl content of less than 0.00012 mol/g and component (B) has an alkenyl content of not less than 0.00012 mol/g; and the molar ratio of the total of silicon-attached hydrogen atoms in component (C) to the total of alkenyl radicals in components (A) and (B) is in the range from 0.8 to 5.0.

In another aspect, the present invention provides a seal member obtained by curing the rubber composition and suited for use with a polymer electrolyte fuel-cell separator.

In a further aspect, the present invention provides a polymer electrolyte fuel-cell separator comprising a substrate and a seal member formed along a periphery on at least one side of the substrate by applying the rubber composition by a compression molding, casting, injection molding, transfer molding, dipping, coating or screen printing technique, and curing thereto. The substrate is a metal thin plate or a substrate comprising an electrically conductive powder and a binder.

DESCRIPTION OF THE PREFERRED EMBODIMENTS

Figure 1:
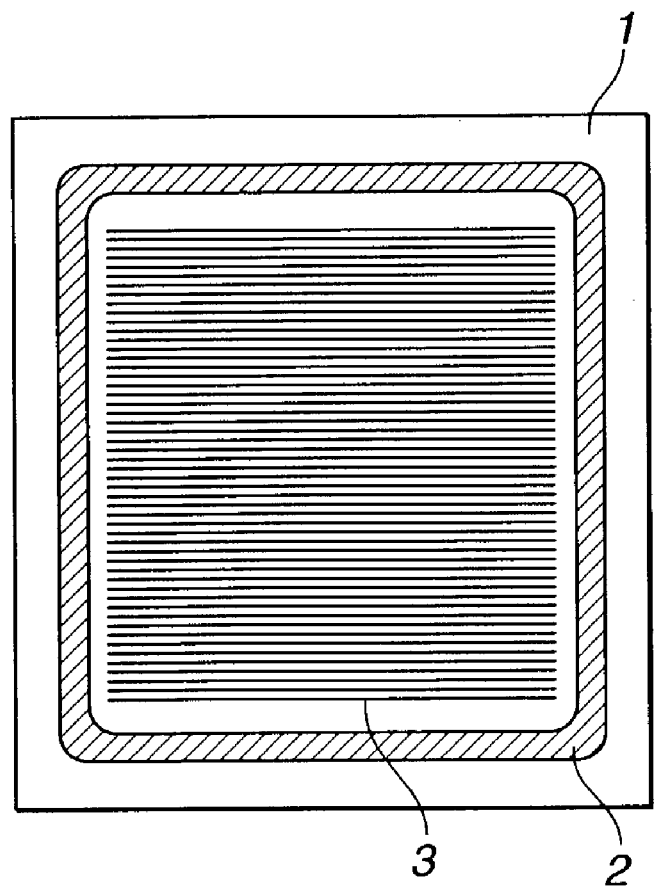
FIG. 1 is a plan view of one exemplary polymer electrolyte fuel-cell separator according to the invention.

Component (A) in the rubber composition of the invention is an organopolysiloxane which is blocked at both ends of the molecular chain with the same or different radicals selected from among alkenyldialkylsiloxy, dialkenylalkylsiloxy and trialkenylsiloxy radicals, and which does not contain an aliphatic unsaturated monovalent hydrocarbon radical attached to a silicon atom on any molecular side chain (that is, as a substituted or unsubstituted monovalent hydrocarbon radical attached to a silicon atom in difunctional siloxane units constituting the (poly)siloxane backbone). The organopolysiloxane (A) typically has the following general formula (I).

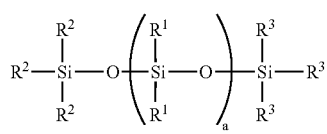

(I)

Herein, $R^1$, which may be the same or different, is a substituted or unsubstituted monovalent hydrocarbon radical having 1 to 10 carbon atoms, preferably 1 to 8 carbon atoms, and free of aliphatic unsaturation; each of $R^2$ and $R^3$, which may be the same or different, is a substituted or unsubstituted monovalent hydrocarbon radical having 1 to 10 carbon atoms, preferably 1 to 8 carbon atoms, at least one $R^2$ and at least one $R^3$ being alkenyl; and "a" is an integer of 200 to 2000, preferably 250 to 1500.

Examples of suitable substituted or unsubstituted monovalent hydrocarbon radicals represented by $R^1$ include alkyl radicals such as methyl, ethyl, propyl, isopropyl, butyl, isobutyl, tert-butyl, pentyl, neopentyl, hexyl, cyclohexyl, octyl, nonyl and decyl; aryl radicals such as phenyl, tolyl, xylyl and naphthyl; aralkyl radicals such as benzyl, phenylethyl and phenylpropyl; and substituted radicals of the foregoing in which some or all of the hydrogen atoms are substituted with halogen atoms (e.g., fluoro, bromo, chloro), cyano radicals or the like, such as chloromethyl, chloropropyl, bromoethyl, trifluoropropyl and cyanoethyl.

Examples of suitable substituted or unsubstituted monovalent hydrocarbon radicals represented by $R^2$ and $R^3$ include alkyl radicals such as methyl, ethyl, propyl, isopropyl, butyl, isobutyl, tert-butyl, pentyl, neopentyl, hexyl, cyclohexyl, octyl, nonyl and decyl; aryl radicals such as phenyl, tolyl, xylyl and naphthyl; aralkyl radicals such as benzyl, phenylethyl and phenylpropyl; alkenyl radicals such as vinyl, allyl, propenyl, isopropenyl, butenyl, hexenyl, cyclohexenyl and octenyl; and substituted radicals of the foregoing in which some or all of the hydrogen atoms are substituted with halogen atoms (e.g., fluoro, bromo, chloro), cyano radicals or the like, such as chloromethyl, chloropropyl, bromoethyl, trifluoropropyl and cyanoethyl. For each of $R^2$ and $R^3$, at least one is an alkenyl radical, preferably having 2 to 8 carbon atoms, more preferably 2 to 6 carbon atoms, with vinyl being most preferred.

Preferably the organopolysiloxane (A) has an alkenyl content of less than 0.00012 mol/g and more preferably $1.0 \times 10^{-6}$ mol/g to $1.0 \times 10^{-4}$ mol/g. An alkenyl content of less than $1.0 \times 10^{-6}$ mol/g may lead to low rubber hardness, failing to provide sufficient seal tightness. An alkenyl content of 0.00012 mol/g or greater may result in brittle rubber due to a short molecular chain and too high a crosslinking density.

It is preferred that at least 90 mol % of the entire organic radicals attached to silicon atoms (i.e., the total of substituted or unsubstituted monovalent hydrocarbon radicals represented by $R^1$, $R^2$ and $R^3$) be methyl. Also preferably, the organopolysiloxane (A) has a (weight) average degree of polymerization of 200 to 2,000, more preferably 250 to 1,500. A (weight) average degree of polymerization of less than 200 may fail to provide a sufficient rubber elasticity to serve as a seal member whereas a (weight) average degree of polymerization of more than 2,000 may lead to too high a viscosity to mold into a seal member.

Component (B) is an organopolysiloxane containing per molecule at least three alkenyl radicals each attached to a silicon atom on molecular side chains (that is, as substituted or unsubstituted monovalent hydrocarbon radicals attached to silicon atoms in diorganosiloxane units constituting the (poly)siloxane backbone). The organopolysiloxane (B) typically has the following general formula (II).

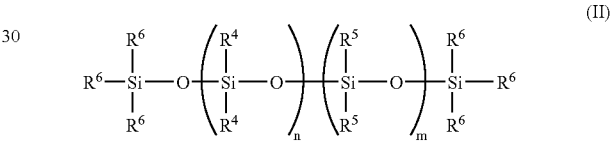

(II)

Herein, $R^4$, which may be the same or different, is a substituted or unsubstituted monovalent hydrocarbon radical having 1 to 10 carbon atoms, preferably 1 to 8 carbon atoms, and free of aliphatic unsaturation; $R^5$ is an alkenyl radical; $R^6$, which may be the same or different, is a substituted or unsubstituted monovalent hydrocarbon radical having 1 to 10 carbon atoms, preferably 1 to 8 carbon atoms; and n+m is an integer of 20 to 3000, preferably 30 to 2000, and $3 \leq m < n$. The unit "m" ($SiR^4_2O$) and the unit "n" ($SiR^4R^5O$) are arranged at random.

Illustrative examples of $R^4$ and $R^6$ in formula (II) are as exemplified for $R^1$ and $R^2$, $R^3$ in formula (I), respectively.

The alkenyl radicals represented by $R^5$ are preferably those having 2 to 8 carbon atoms, more preferably 2 to 6 carbon atoms, examples of which are as illustrated above for $R^2$ and $R^3$, with vinyl being most preferred. The organopolysiloxane (B) should preferably have an alkenyl content of at least 0.00012 mol/g, more preferably 0.00015 mol/g to 0.0030 mol/g. An organopolysiloxane (B) with an alkenyl content of less than 0.00012 mol/g may fail to exert the desired effect when combined with component (A), resulting in insufficient rubber strength. An alkenyl content of more than 0.0030 mol/g may lead to a notable drop of compression set.

With respect to the alkenyl quantity, there are included three or more alkenyl radicals per molecule, preferably 4 to less than 100 alkenyl radicals per molecule. The presence of two or less alkenyl radicals may lead to insufficient rubber strength whereas the presence of 100 or more alkenyl radicals may have an adverse impact on compression set. The organopolysiloxane (B) should preferably have a (weight) average degree of polymerization of 20 to 3,000, more preferably 30 to 2,000 and be liquid at room temperature. A (weight) average degree of polymerization of less than 20 may fail to provide a sufficient rubber strength whereas an organopolysiloxane with a (weight) average degree of polymerization of more than 3,000 may be difficult to compound with other components or impede injection and other molding.

With respect to the structure of organopolysiloxanes (A) and (B), most often each preferably has a linear structure although a partially branched or cyclic structure is acceptable.

Components (A) and (B) are compounded in a ratio ranging from a combination of 95 parts by weight component (A) and 5 parts by weight component (B) to a combination of 70 parts by weight component (A) and 30 parts by weight component (B), provided that the total of components (A) and (B) is 100 parts by weight. Less than 5 parts by weight of component (B) may fail to provide sufficient rubber strength whereas more than 30 parts by weight of component (B) may detract from compression set.

Component (C) in the rubber composition of the invention is an organohydrogenpolysiloxane having at least three hydrogen atoms each attached to a silicon atom (i.e., at least three Si—H radicals) per molecule. It serves as a crosslinking agent for curing the composition through the mechanism that Si—H radicals in its molecule undergo hydrosilylation reaction with alkenyl radicals attached to silicon atoms in components (A) and (B) to effect crosslinking.

Most often, the organohydrogenpolysiloxane (C) is represented by the following average compositional formula (III):

$$R^7_b H_c SiO_{(4-b-c)/2} \qquad (III)$$

wherein $R^7$, which may be the same or different, is a substituted or unsubstituted monovalent hydrocarbon radical having 1 to 10 carbon atoms, preferably 1 to 8 carbon atoms and "b" is a positive number of 0.7 to 2.1, "c" is a positive number of 0.001 to 1.0, and b+c is from 0.8 to 3.0. It has at least three hydrogen atoms, usually 3 to 300 hydrogen atoms, preferably 3 to 100 hydrogen atoms, more preferably 3 to 50 hydrogen atoms, each attached to a silicon atom, per molecule.

Examples of the substituted or unsubstituted monovalent hydrocarbon radical represented by $R^7$ are as described for $R^2$, preferably those free of aliphatic unsaturated bond such as alkenyl. Also preferably, "b" is a positive number of 0.8 to 2.0, "c" is a positive number of 0.01 to 1.0, and b+c is from 1.0 to 2.5.

With respect to the molecular structure, the organohydrogenpolysiloxane may have a linear, cyclic, branched or three-dimensional network structure. The number of silicon atoms in one molecule, that is the degree of polymerization, is preferably about 2 to about 300, especially about 4 to about 150. Differently stated, organohydrogenpolysiloxanes which are liquid at room temperature (25° C.) and typically have a viscosity of less than about 1,000 mPa·s at 25° C., preferably about 0.1 to 500 mPa·s at 25° C. are preferred.

It is noted that the silicon atom-bonded hydrogen atoms (Si—H radicals) may be positioned at the end or an intermediate of the molecular chain or both.

Exemplary of the organohydrogenpolysiloxane (C) are both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, copolymers composed of $(CH_3)_2HSiO_{1/2}$ units and $SiO_{4/2}$ units, and copolymers composed of $(CH_3)_2HSiO_{1/2}$ units, $SiO_{4/2}$ units and $(C_6H_5)_3SiO_{3/2}$ units.

The amount of the organohydrogenpolysiloxane (C) blended is 0.5 to 20 parts, especially 1.0 to 15 parts by weight, per 100 parts by weight of components (A) and (B) combined. The molar ratio of silicon atom-bonded hydrogen atoms (Si—H radicals) in organohydrogenpolysiloxane (C) to the total of alkenyl radicals in components (A) and (B), [Si—H/alkenyl] is preferably from 0.8:1 to 5.0:1, especially from 1.0:1 to 3.0:1. A molar ratio outside this range is likely to increase the compression set of cured rubber, aggravating seal tightness.

Component (D) is fumed silica which is essential to impart satisfactory strength to silicone rubber to provide seal tightness. The fumed silica should have a specific surface area of 50 to 400 $m^2/g$, preferably 100 to 350 $m^2/g$, as measured by the BET method. A surface area below 50 $m^2/g$ fails to impart strength whereas a surface area above 400 $m^2/g$ makes it difficult to compound and detracts from compression set.

The fumed silica may be used as such, but preferably after treatment with a surface hydrophobizing agent. Alternatively, a surface treating agent is added when the fumed silica is mixed with the silicone fluid, whereby the fumed silica is treated during the mixing step. Suitable surface treating agents include alkylalkoxysilanes, alkylchlorosilanes, alkylsilazanes, silane coupling agents, titanate treating agents, and fatty acid esters alone or in admixture. When two or more agents are used, they may be applied at the same time or different times.

The amount of the fumed silica (D) blended is 10 to 40 parts, especially 15 to 35 parts by weight, per 100 parts by weight of components (A) and (B) combined. Less than 10 parts of the fumed silica fails to provide satisfactory rubber strength whereas more than 40 parts increases compression set.

Component (E) is an addition reaction catalyst for promoting the addition reaction between alkenyl radicals in the organopolysiloxanes (A) and (B) and silicon atom-bonded hydrogen atoms (Si—H radicals) in the organohydrogenpolysiloxane (C). The catalyst is, most often, selected from platinum group metal catalysts including platinum catalysts such as platinum black, platinic chloride, chloroplatinic acid, reaction products of chloroplatinic acid with monohydric alcohols, complexes of chloroplatinic acid with olefins, and platinum bisacetoacetate as well as palladium catalysts and rhodium catalysts. Of these, the platinum catalysts are especially preferred.

The amount of the addition reaction catalyst blended is a catalytic amount capable of promoting the addition reaction and usually about 0.5 to 1,000 ppm, especially about 1 to 500 ppm of platinum group metal based on the weight of components (A) and (B) combined. At less than 1 ppm of platinum group metal, addition reaction may not be significantly promoted, resulting in under-cure. More than 1,000 ppm may be uneconomical because no additional effects are exerted on the reaction.

If necessary, the composition may further contain other components, for example, fillers such as precipitated silica, ground quartz, diatomaceous earth and calcium carbonate; electrically conductive agents such as carbon black, conductive zinc white and metal powder; hydrosilylation reaction regulating agents such as nitrogenous compounds, acetylene compounds, phosphorus compounds, nitrile compounds, carboxylates, tin compounds, mercury compounds, and sulfur compounds; heat resistance improvers such as iron oxide and cerium oxide; internal parting agents such as dimethylsilicone fluid; tackifiers, and thixotropic agents.

The seal member of the invention is a cured product of the addition reaction curing type silicone rubber composition comprising the above-described components. The silicone rubber composition is cured in a well-known manner and used in the sealing of a polymer electrolyte fuel-cell separator.

When a fuel-cell separator sealing member is prepared using the cured rubber of the present invention, the silicone rubber composition is molded into a seal shape by compression molding, casting, injection molding or the like, and the molded seal is combined with the separator. Alternatively, the silicone rubber composition is formed integral with a separator by dipping, coating, screen printing, insert molding or the like. In either case, preferred curing conditions include a temperature of 100 to 300° C. and a time of 10 seconds to 30 minutes.

The separator substrate used herein is preferably a metal thin plate or a substrate obtained by integral molding of a conductive powder and a binder. A seal member is formed on the separator substrate by the above-mentioned methods, obtaining a polymer electrolyte fuel-cell separator.

Examples of the electrically conductive powder include natural graphite such as flake graphite, artificial graphite, and conductive carbon black such as acetylene black and Ketjen Black, but are not limited thereto. Exemplary binders include epoxy resins, phenolic resins and rubber-modified phenolic resins.

Figure 2:
FIG. 2 is a cross-sectional view of the separator.

Referring to FIGS. 1 and 2, there is shown a separator for a polymer electrolyte fuel cell according to one embodiment of the invention. A seal portion or member 2 is formed on a separator substrate 1 along the periphery thereof and in a closed loop shape, by applying the silicone rubber composition of the invention by a compression molding, casting, injection molding, transfer molding, dipping, coating or screen printing technique, followed by curing. The cured product of the silicone rubber composition serving as the seal portion or member. Note that the substrate 1 is formed with gas flow channels 3.

The seal member thus formed preferably has a thickness or height of 0.1 to 2 mm as best shown in FIG. 2. A seal member of less than 0.1 mm is sometimes difficult to mold and may fail to provide an effective seal. A seal thickness of more than 2 mm may interfere with size reduction.

EXAMPLE

Examples of the invention are given below by way of illustration and not by way of limitation. All parts are by weight.

Example 1

40 parts of dimethylpolysiloxane (1) blocked with a dimethylvinylsiloxy radical at each end and having an average degree of polymerization of 500 and a vinyl content of 0.000055 mol/g, 20 parts of dimethylpolysiloxane (2) blocked with a trimethylsiloxy radical at each end, containing, on the average, 6 vinyl radicals attached to molecular side chains per molecule, and having an average degree of polymerization of 150 and a vinyl content of 0.00055 mol/g, 35 parts of fumed silica having a specific surface area of 200 $m^2/g$ (Aerosil 200 by Nippon Aerosil Co., Ltd.), 6 parts of hexamethyldisilazane, and 2.0 parts of water were mixed at room temperature for 30 minutes. The mixture was heated at 150° C., agitated at the temperature for 3 hours, and then cooled, yielding a silicone rubber base.

To 95 parts of the silicone rubber base was added 60 parts of dimethylpolysiloxane (1). Agitation was continued for 30 minutes, after which were added 4.1 parts (giving [Si—H/vinyl]=1.5) of methylhydrogenpolysiloxane (3) having Si—H radicals at both ends and on side chains wherein the degree of polymerization is 20 and the Si—H content is 0.0060 mol/g as the crosslinking agent and 0.05 part of ethynyl cyclohexanol as the reaction regulating agent. Subsequent agitation for 15 minutes yielded a mixture.

This mixture, 100 parts, was mixed with 0.1 part of a platinum catalyst (Pt concentration 1 wt %) to give a silicone rubber composition. It was press cured at 120° C. for 10 minutes, and post cured in an oven at 200° C. for 4 hours. The cured sample was measured for hardness, tensile strength, elongation at break, tear strength and compression set according to JIS K6249. The results are shown in Table 1.

Example 2

80 parts of dimethylpolysiloxane (4) blocked with a methyldivinylsiloxy radical at each end and having an average degree of polymerization of 750 and a vinyl content of 0.000072 mol/g, 30 parts of surface-hydrophobized fumed silica having a specific surface area of 260 $m^2/g$ (Rheoloseal DM30S by Tokuyama Corp.), 5 parts of hexamethyldisilazane, and 1.0 part of water were mixed at room temperature for 30 minutes. The mixture was heated at 150° C., agitated at the temperature for 3 hours, and then cooled, yielding a silicone rubber base.

To 120 parts of the silicone rubber base was added 15 parts of dimethylpolysiloxane (5) blocked with a dimethylvinylsiloxy radical at each end, containing, on the average, 14 vinyl radicals on molecular side chains per molecule, and having an average degree of polymerization of 250 and a vinyl content of 0.00089 mol/g. Agitation was continued for 30 minutes, after which were added 6.4 parts (giving [Si—H/vinyl]=2.0) of methylhydrogenpolysiloxane (3) having Si—H radicals at both ends and on side chains wherein the degree of polymerization is 20 and the Si—H content is 0.0060 mol/g as the crosslinking agent and 0.05 part of ethynyl cyclohexanol as the reaction regulating agent. Subsequent agitation for 15 minutes yielded a mixture.

This mixture, 100 parts, was mixed with 0.1 part of a platinum catalyst (Pt concentration 1 wt %) to give a silicone rubber composition. It was press cured at 120° C. for 10 minutes, and post cured in an oven at 200° C. for 4 hours. The cured sample was measured for hardness, tensile strength, elongation at break, tear strength and compression set according to JIS K6249. The results are shown in Table 1.

Comparative Example 1

60 parts of dimethylpolysiloxane (1) blocked with a dimethylvinylsiloxy radical at each end and having an average degree of polymerization of 500 and a vinyl content of 0.000055 mol/g, 35 parts of fumed silica having a specific surface area of 200 $m^2/g$ (Aerosil 200 by Nippon Aerosil Co., Ltd.), 6 parts of hexamethyldisilazane, and 2.0 parts of water were mixed at room temperature for 30 minutes. The mixture was heated at 150° C., agitated at the temperature for 3 hours, and then cooled, yielding a silicone rubber base.

To 95 parts of the silicone rubber base was added 60 parts of dimethylpolysiloxane (1). Agitation was continued for 30 minutes, after which were added 1.7 parts (giving [Si—H/vinyl]=1.5) of methylhydrogenpolysiloxane (3) having Si—H radicals at both ends and on side chains wherein the degree of polymerization is 20 and the Si—H content is 0.0060 mol/g as the crosslinking agent and 0.05 part of ethynyl cyclohexanol as the reaction regulating agent. Subsequent agitation for 15 minutes yielded a mixture.

This mixture, 100 parts, was mixed with 0.1 part of a platinum catalyst (Pt concentration 1 wt %) to give a silicone rubber composition. It was press cured at 120° C. for 10 minutes, and post cured in an oven at 200° C. for 4 hours. The cured sample was measured for hardness, tensile strength, elongation at break, tear strength and compression set according to JIS K6249. The results are shown in Table 1.

Comparative Example 2

50 parts of dimethylpolysiloxane (4) blocked with a methyldivinylsiloxy radical at each end and having an average degree of polymerization of 750 and a vinyl content of 0.000072 mol/g, 30 parts of dimethylpolysiloxane (5) blocked with a dimethylvinylsiloxy radical at each end, containing, on the average, 14 vinyl radicals on molecular side chains per molecule, and having an average degree of polymerization of 250 and a vinyl content of 0.00089 mol/g (used in Example 2), 30 parts of surface-hydrophobized fumed silica having a specific surface area of 260 $m^2/g$ (Rheoloseal DM30S by Tokuyama Corp.), 5 parts of hexamethyldisilazane, and 1.0 part of water were mixed at room temperature for 30 minutes. The mixture was heated at 150° C., agitated at the temperature for 3 hours, and then cooled, yielding a silicone rubber base.

To 120 parts of the silicone rubber base was added 15 parts of dimethylpolysiloxane (5). Agitation was continued for 30 minutes, after which were added 14.5 parts (giving [Si—H/vinyl]=2.0) of methylhydrogenpolysiloxane (3) having Si—H radicals at both ends and on side chains wherein the degree of polymerization is 20 and the Si—H content is 0.0060 mol/g as the crosslinking agent and 0.05 part of ethynyl cyclohexanol as the reaction regulating agent. Subsequent agitation for 15 minutes yielded a mixture.

This mixture, 100 parts, was mixed with 0.1 part of a platinum catalyst (Pt concentration 1 wt %) to give a silicone rubber composition. It was press cured at 120° C. for 10 minutes, and post cured in an oven at 200° C. for 4 hours. The cured sample was measured for hardness, tensile strength, elongation at break, tear strength and compression set according to JIS K6249. The results are shown in Table 1.

Comparative Example 3

60 parts of dimethylpolysiloxane (1) blocked with a dimethylvinylsiloxy radical at each end and having an average degree of polymerization of 500 and a vinyl content of 0.000055 mol/g, 35 parts of fumed silica having a specific surface area of 200 $m^2/g$ (Aerosil 200 by Nippon Aerosil Co., Ltd.), 6 parts of hexamethyldisilazane, and 2.0 parts of water were mixed at room temperature for 30 minutes. The mixture was heated at 150° C., agitated at the temperature for 3 hours, and then cooled, yielding a silicone rubber base.

To 95 parts of the silicone rubber base were added 20 parts of a dimethylpolysiloxane (6) blocked with a dimethylvinylsiloxy radical at each end,-containing, on the average, 1 vinyl radical on molecular side chain per molecule, and having an average degree of polymerization of 200 and a vinyl content of 0.00020 mol/g, and 20 parts of dimethylpolysiloxane (1). Agitation was continued for 30 minutes, after which were added 2.1 parts (giving [Si—H/vinyl]=1.5) of methylhydrogenpolysiloxane (3) having Si—H radicals at both ends and on side chains wherein the degree of polymerization is 20 and the Si—H content is 0.0060 mol/g as the crosslinking agent and 0.05 part of ethynyl cyclohexanol as the reaction regulating agent. Subsequent agitation for 15 minutes yielded a mixture.

This mixture, 100 parts, was mixed with 0.1 part of a platinum catalyst (Pt concentration 1 wt %) to give a silicone rubber composition. It was press cured at 120° C. for 10 minutes, and post cured in an oven at 200° C. for 4 hours. The cured sample was measured for hardness, tensile strength, elongation at break, tear strength and compression set according to JIS K6249. The results are shown in Table 1.

TABLE 1

|  | Example | | Comparative Example | | |
| --- | --- | --- | --- | --- | --- |
|  | 1 | 2 | 1 | 2 | 3 |
| Hardness (Durometer A) | 52 | 47 | 41 | 66 | 46 |
| Tensile strength (MPa) | 7.9 | 8.2 | 6.9 | 6.2 | 7.1 |
| Elongation at break (%) | 480 | 520 | 560 | 220 | 380 |
| Tear strength (kN/m) | 31 | 33 | 17 | 22 | 15 |
| Compression set (%) | 6 | 7 | 5 | 19 | 8 |

Note that the tear strength test used crescent shaped specimens.

Using the rubber compositions of the invention, seal members having improved strength and reduced compression set are obtained. The seal members are useful for use with separators in polymer electrolyte fuel cells.

Japanese Patent Application No. 2002-052811 is incorporated herein by reference.

Reasonable modifications and variations are possible from the foregoing disclosure without departing from either the spirit or scope of the present invention as defined by the claims.

The invention claimed is:

1. A polymer electrolyte fuel-cell separator comprising:
   a metal thin plate or a substrate comprising an electrically conductive powder and a binder; and
   a seal member formed along a periphery on at least one side of the plate or substrate by applying along said periphery on at least one side of said plate or substrate a rubber composition comprising, in parts by weight, (A) 70 to 95 parts of an organopolysiloxane which is blocked at either end of the molecular chain with a radical independently selected from the group consisting of alkenyldialkylsiloxy, dialkenylalkylsiloxy and trialkenylsiloxy radicals, and which does not contain an aliphatic unsaturated monovalent hydrocarbon radical attached to a silicon atom on any molecular side chain, (B) 5 to 30 parts of an organopolysiloxane containing at least three alkenyl radicals each attached to a silicon atom on molecular side chains per molecule, (C) 0.5 to 20 parts, per 100 parts of components (A) and (B) combined, of an organohydrogenpolysiloxane having at least three hydrogen atoms each attached to a silicon atom per molecule, (D) 10 to 40 parts, per 100 parts of components (A) and (B) combined, of fumed silica having a specific surface area of 50 to 400 $m^2/g$, and (E) a catalytic amount of an addition reaction catalyst, by a compression molding, casting, injection molding, transfer molding, dipping, coating or screen printing technique, and curing said composition on said periphery on at least one side of said plate or substrate.

2. The polymer electrolyte fuel-cell separator of claim 1, wherein the organopolysiloxane (A) has an average degree of polymerization of 200 to 2,000, at least 90 mol % of the entire organic radicals attached to silicon atoms being methyl.

3. The polymer electrolyte fuel-cell separator of claim 1, wherein component (A) has an alkenyl content of less than 0.00012 mol/g and component (B) has an alkenyl content of at least 0.000 12 mol/g.

4. The polymer electrolyte fuel-cell separator of claim 1, wherein the molar ratio of the total of silicon-attached hydrogen atoms in component (C) to the total of alkenyl radicals in components (A) and (B) is in the range from 0.8 to 5.0.

* * * * *